(12) United States Patent
Shain et al.

(10) Patent No.: US 10,602,061 B2
(45) Date of Patent: Mar. 24, 2020

(54) SWITCHABLE MULTI-SENSOR CAMERA SYSTEM AND METHODS

(71) Applicant: FLIR Security, Inc., Ridgefield Park, NJ (US)

(72) Inventors: Chaim Shain, Parkland, FL (US); Yu-Chuan Chang, New Taipei (TW); Shih-Tso Liao, New Taipei (TW)

(73) Assignee: FLIR Security, Inc., Ridgefield Park, NJ (US)

( * ) Notice: Subject to any disclaimer, the term of this patent is extended or adjusted under 35 U.S.C. 154(b) by 16 days.

(21) Appl. No.: 16/141,695

(22) Filed: Sep. 25, 2018

(65) Prior Publication Data

US 2019/0098212 A1   Mar. 28, 2019

Related U.S. Application Data

(60) Provisional application No. 62/653,431, filed on Apr. 5, 2018, provisional application No. 62/563,042, filed on Sep. 25, 2017.

(51) Int. Cl.
| | |
|---|---|
| *H04N 5/232* | (2006.01) |
| *H04N 5/247* | (2006.01) |
| *H04N 13/243* | (2018.01) |
| *G06T 7/70* | (2017.01) |
| *H04N 5/225* | (2006.01) |

(52) U.S. Cl.
CPC ........... *H04N 5/23238* (2013.01); *G06T 7/70* (2017.01); *H04N 5/2252* (2013.01); *H04N 5/23245* (2013.01); *H04N 5/247* (2013.01); *H04N 13/243* (2018.05)

(58) Field of Classification Search
CPC ............. H04N 5/23238; H04N 13/243; H04N 5/2252; H04N 5/23245; H04N 5/247; G06T 7/70
See application file for complete search history.

(56) References Cited

U.S. PATENT DOCUMENTS

| | | | | |
|---|---|---|---|---|
| 2010/0128123 | A1* | 5/2010 | DiPoala | G08B 13/19619 348/143 |
| 2015/0177596 | A1* | 6/2015 | Bergsten | F16M 13/022 248/205.1 |
| 2019/0068892 | A1* | 2/2019 | Yasutake | H04N 5/2252 |

OTHER PUBLICATIONS

"8 MP JPEG2000 HD 360° Pano Camera", Avigilon, retrieved at http://avigilon.com/products/video-surveillance/cameras/hd-panoramic/jpeg2000-hd-panoramic-camera/8-mp-360-jpeg2000-dome-panoramic/, Nov. 13, 2013, 1 page.
"12 MP Optera Multi-Sensor Panoramic IP Cameras", Pelco, retrieved at https://www.pelco.com/panoramic-ip-cameras/wdr-low-light-performance-optera, May 19, 2015, 4 pages.
"Dahua 6mp Multi-Lens Panoramic Network IR Bullet Camera", Dahua Technology, retrieved at https://www.viewtech.co.nz/dahua-3x2mp-multi-lens-panoramic-network-ir-bullet-camera, May 18, 2017, 6 pages.

(Continued)

*Primary Examiner* — Nicholas G Giles
(74) *Attorney, Agent, or Firm* — Haynes and Boone, LLP

(57) ABSTRACT

Various embodiments of the present disclosure may include an imaging system with a plurality of camera modules. The view configuration of the camera modules may be switchable. Thus, the imaging system may switch between, at least, a 180 view configuration and a 360 degree view configuration. A camera module may also be coupled to the imaging system to provide an additional camera.

20 Claims, 17 Drawing Sheets

(56) References Cited

OTHER PUBLICATIONS

"Digital Watchdog New MEGApix PANO 8MP and 48MP Caas Cameras Now in Beta Testing", Digital Watchdog, retrieved at https://www.securitysales.com/product-news/digital_watchdog_new_megapix_pano_8mp_and_48mp_caas_cameras_now_in_beta_tes/, Mar. 26, 2015, 2 pages.

"SurroundVideo Series", Arecont Vision, retrieved at https://arecontvision.com/landing-pages/surround-video/overview.php, May 2006, 8 pages.

\* cited by examiner

SWITCHABLE MULTI-SENSOR CAMERA SYSTEM AND METHODS

CROSS-REFERENCE TO RELATED APPLICATIONS

This application claims priority to and the benefit of U.S. Provisional Patent Application No. 62/563,042 filed Sep. 25, 2017 and entitled "SWITCHABLE MULTI-SENSOR CAMERA SYSTEM AND METHODS" and U.S. Provisional Patent Application No. 62/653,431 filed Apr. 5, 2018 and entitled "SWITCHABLE MULTI-SENSOR CAMERA SYSTEM AND METHODS," the contents both of which are hereby incorporated by reference in their entireties.

TECHNICAL FIELD

One or more embodiments of the invention relate generally to imaging devices and more particularly to, for example, configurable camera systems.

BACKGROUND

Currently, camera systems are available in either 180 degree or 360 degree view configurations. However, due to the complexity of calibrating a camera system with multiple sensors, camera systems typically have fixed configurations, with different applications requiring different types of camera configurations.

SUMMARY

In various embodiments, an imaging system may be disclosed, which may include a base, a camera guide including an inner open area, a positioning arm, and a plurality of camera modules coupled to the base. At least one of the plurality of camera modules is a movable camera module coupled to the positioning arm configured to move the movable camera module between at least a plurality of view configurations. The movable camera module is disposed within the inner open area of the camera guide. The inner open area is configured to control a movement path of the movable camera module.

In another embodiment, a removable camera module may be disclosed which may include a module body including a plurality of cutouts, a camera disposed within the module body, and a plurality of latches, where the module body is configured to be disposed within an opening of a camera system operating in a 360 degree view configuration, where each of the plurality of cutouts is configured to be disposed adjacent to a camera of the camera system, and where the plurality of latches are configured to couple to a portion of the opening to hold the module body within the opening.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems and techniques for a multi-camera module imaging system are provided. In a certain embodiment, an imaging system may include a plurality of camera modules configured to switch between a plurality of view configurations. The imaging system may include a base, a camera guide that includes an inner open area, a positioning arm, and the plurality of camera modules. The camera modules may be coupled to the base and at least one of the camera modules may be a movable camera module disposed within the inner open area and coupled to the positioning arm. The inner open area may be configured to guide movement of the movable camera module. The movable camera module may be configured to move between at least a plurality of view configurations.

Figure 1:
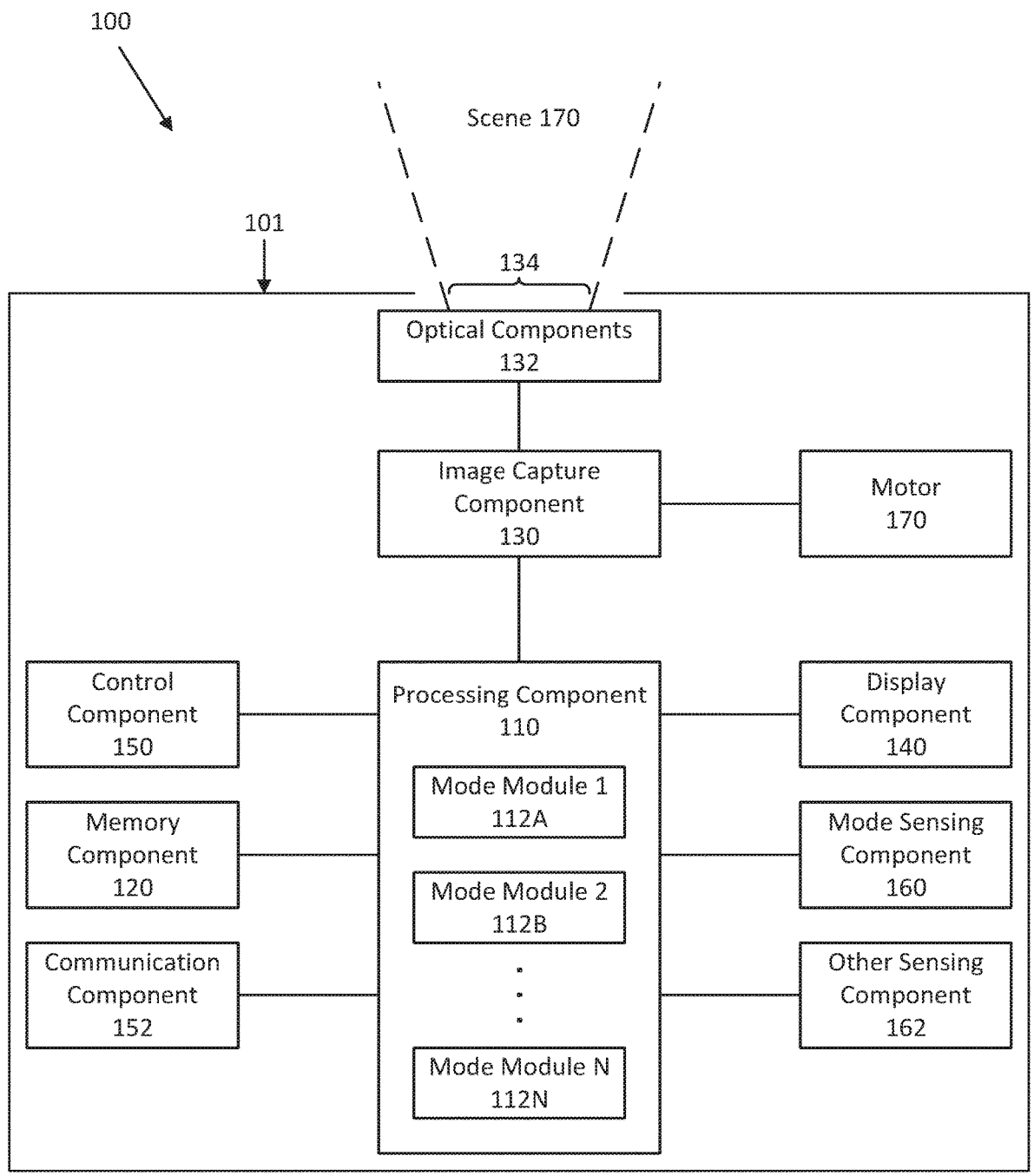
FIG. 1 illustrates a block diagram of a camera module in accordance with an embodiment of the disclosure.

FIG. 1 illustrates a block diagram of a camera module 100 in accordance with an embodiment of the disclosure. Camera module 100 may be used to capture and process image frames in accordance with various techniques described herein. In one embodiment, various components of camera module 100 may be provided in a housing 101, such as a housing of a camera (e.g., security camera), a personal electronic device (e.g., a mobile phone), or other system. In another embodiment, one or more components of camera module 100 may be implemented remotely from each other in a distributed fashion (e.g., networked or otherwise).

In one embodiment, camera module 100 includes a processing component 110, a memory component 120, an image capture component 130, optical components 132 (e.g., one or more lenses configured to receive electromagnetic radiation through an aperture 134 in the housing 101 and pass the electromagnetic radiation to the image capture component 130), a display component 140, a control component 150, a communication component 152, a mode sensing component 160, a sensing component 162, and a motor 170.

In various embodiments, camera module 100 may be implemented as an imaging device, such as a camera, to capture image frames, for example, of a scene 170 (e.g., a field of view). Camera module 100 may represent any type of camera system which, for example, detects electromagnetic radiation (e.g., irradiance or visual light) and provides representative data (e.g., one or more still image frames or video image frames). For example, camera module 100 may represent a camera that is directed to detect one or more ranges (e.g., wavebands) of electromagnetic radiation and provide associated image data. Camera module 100 may be a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, camera module 100 may be integrated as part of a non-mobile installation to provide image frames to be stored and/or displayed.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in processing component 110 or stored on memory component 120 for access and execution by processing component 110. In another aspect, processing component 110 may be adapted to perform various types of image processing techniques as described herein.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored as a machine readable medium in a non-transitory manner (e.g., within a memory, a hard drive, a compact disk, a digital video disk, or a flash memory) to be executed by a computer (e.g., logic or processor-based system) to perform various methods disclosed herein.

In various embodiments, the machine readable medium may be included as part of camera module 100 and/or separate from camera module 100, with stored mode modules 112A-112N provided to camera module 100 by coupling the device storing the machine readable medium to camera module 100 and/or by camera module 100 downloading (e.g., via a wired or wireless link) the mode modules 112A-112N from the device storing the machine readable medium. In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application. Additional mode modules may also be provided for different planned usages. For example, mode modules may be provided for an export application and an import application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 to perform various methods, processes, and modes of operations in a manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of camera module 100).

In certain embodiments, the motor 170 may be coupled to the image capture component 130. The motor 170 may move components within the image capture component 130. For example, the motor 170 may move a housing, a lens, a cam tube, or a lens cell of the image capture component 130.

Processing component 110 may be adapted to receive image signals from image capture component 130, process image signals (e.g., to provide processed image data), store image signals or image data in memory component 120, and/or retrieve stored image signals from memory component 120. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In one embodiment, processing component 110 may initially process a captured thermal image frame and present a processed image frame in one mode, corresponding to mode modules 112A-112N, and then upon user input to control component 150, processing component 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of camera module 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electromagnetic triggering mechanism, or some combination thereof. For example for one or more embodiments, mode sensing component 160 senses a mode of operation corresponding to the camera module's 100 intended application based on the type of mount (e.g., accessory or fixture) to which a user has coupled the camera module 100 (e.g., image capture component 130). Alternatively, the mode of operation may be provided via control component 150 by a user of camera module 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, camera module 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the camera module 100 to a vehicle or part thereof and may include a sensor adapted to provide a sensing signal to processing component 110 when the camera module 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of camera module 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of camera module 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, camera module 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of camera module 100 may be combined and/or implemented or not, as desired or depending on application requirements, with camera module 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the camera module 100 may be associated with a particular network link such as for example a URL (Uniform Resource Locator), an IP (Internet Protocol) address, and/or a mobile phone number.

Figure 2:
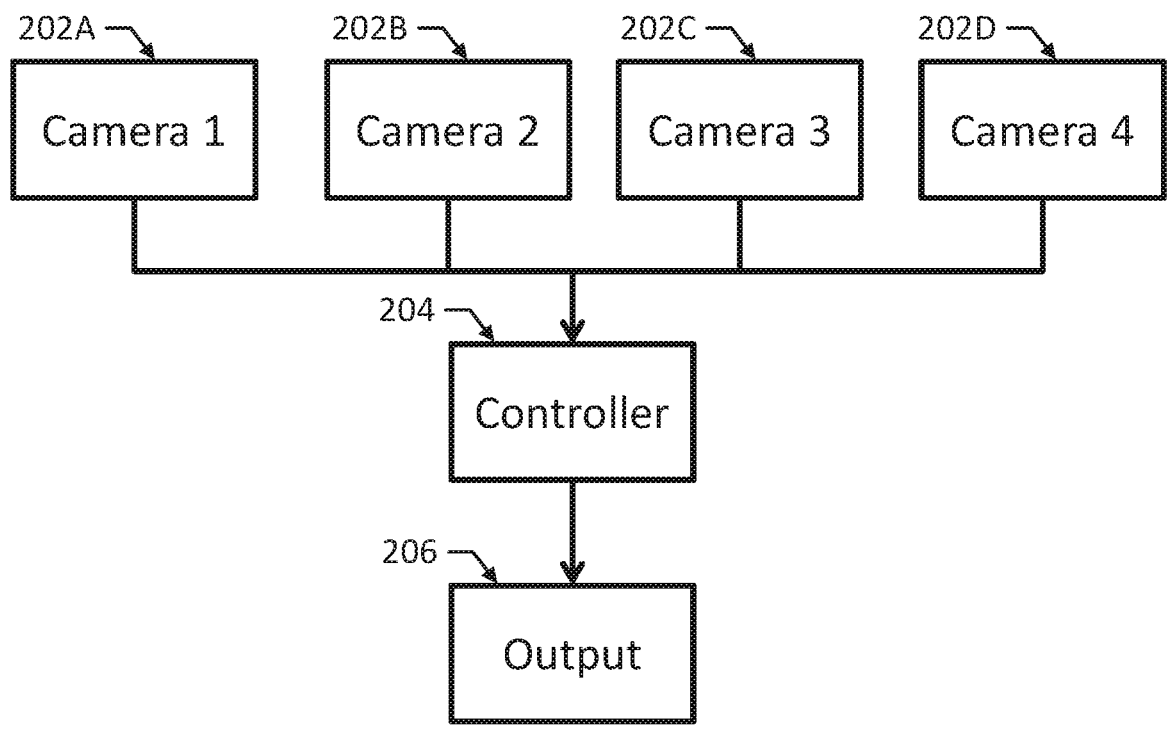
FIG. 2 illustrates a schematic view of a multi-camera module imaging system in accordance with an embodiment of the disclosure.

FIG. 2 illustrates a schematic view of a multi-camera module imaging system in accordance with an embodiment of the disclosure. The multi-camera module imaging system as illustrated in FIG. 2 includes cameras 202A-D, controller 204, and output 206. While the system of FIG. 2 illustrates four cameras 202A-D, other systems may include any number of cameras, such as two cameras, three cameras, five cameras, or six or more cameras.

Cameras 202A-D may each output camera data (e.g., image data) to controller 204. Controller 204 may be any type of controller (e.g., a FPGA or other type as described for processing component 110 of FIG. 1) that may receive image data and/or process such data into a composite image. Controller 204 may, for example, include any type of controller architecture described herein (e.g., a processor external to the FPGA or imaging system).

Controller 204 may receive image data from cameras 202A-D and generate (e.g., stitch together) a composite image from the image data. In certain examples, image data from one or more of cameras 202A-D may be cropped, blended, stitched, and/or otherwise processed to generate the composite image. Controller 204 may then provide the composite image to output 206. Output 206 may, for example, be a further controller. In certain embodiments, output 206 may only be configured to receive a limited number of images (e.g., one or two images) and, thus, generating the composite image may allow for a greater effective field of view. Generating the composite image is further described in FIG. 8.

Figure 3:
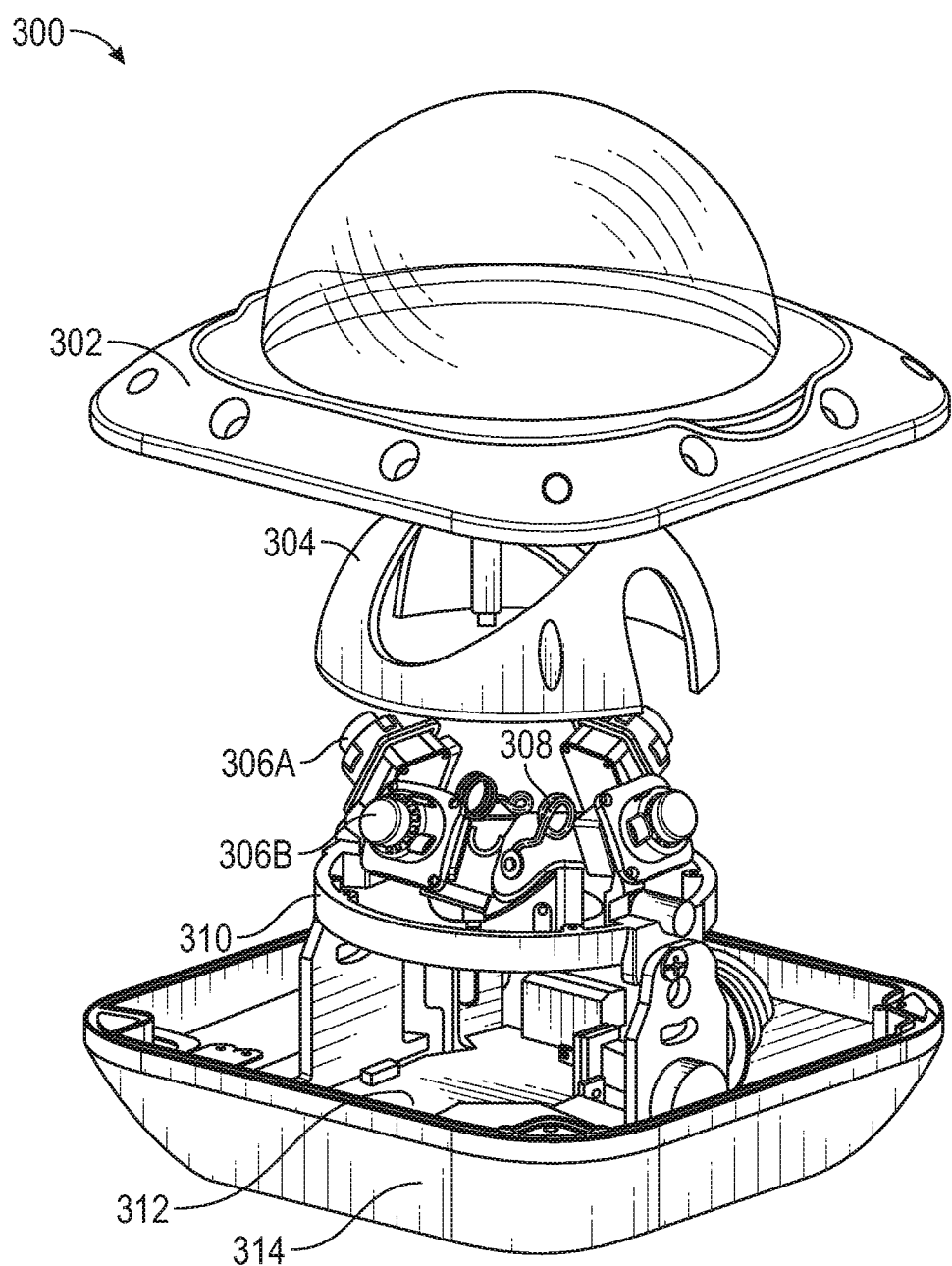
FIG. 3 illustrates an exploded view of an imaging system in accordance with an embodiment of the disclosure.

FIG. 3 illustrates an exploded view of an imaging system in accordance with an embodiment of the disclosure. FIG. 3 includes imaging system 300 with top case 302, camera guide 304, cameras 306A-D (only cameras 306A and 306B are highlighted), positioning arm 308, base 310, processing circuitry 312, and bottom case 314.

Top case 302 and bottom case 314 may constitute all or a portion of the casing of imaging system 300. As such, at least a portion of the other components of imaging system 300 may be disposed within top case 302 and bottom case 314. In certain embodiments, top case 302 and bottom case 314 may be configured to couple to each other.

Imaging system 300 may include a plurality of cameras 306A-D. The plurality of cameras 306A-D may be oriented to collectively image a scene and provide a composite image of the scene when image data from the cameras 306A-D are processed. At least one of the cameras 306A-D may be a movable camera. In this example, imaging system 300 includes two movable cameras, each movable camera coupled to positioning arm 308.

Positioning arm 308 may control movement of the movable cameras. In certain embodiments, positioning arm 308 may be configured to press the movable cameras against an inner open area of camera guide 304 (e.g., inner open area 404 shown in FIGS. 4A-C). The inner open area may control movement of the movable cameras and may include features to hold the movable cameras within at least two areas.

Additionally, camera guide 304 may include one or more other openings. Such openings may hold and position cameras that are not configured to be moved. As such, positioning of all cameras 306A-D (whether movable or not) are controlled by camera guide 304, increasing the precision in positioning cameras 306A-D. Also, controllers must be calibrated to generate a composite image from a plurality of cameras as even minor movement in the positioning of one camera relative to another can cause the resulting composite image to be faulty (e.g., the composite image may include double vision). Having the position of all cameras be controlled by camera guide 304 allows for accurate control of the positioning of the cameras without misalignment over time and, thus, allows for imaging system 100 to be movable between a plurality of view configurations without problems in generating the resulting image (e.g., only an initial calibration is needed for the configurations as the movable cameras can be positioning in the same positioned each time they are repositioned).

Base 310 may hold positioning arm and/or one or more cameras 306A-D. Base 310 may also couple to camera guide 304 so that cameras 306A-D are contained within base 310 and camera guide 304. Additionally, base 310 may include and/or couple to one or more features that allows for the viewpoint cameras 306A-D to be collectively changed (e.g., rotated and/or otherwise adjusted).

Processing circuitry 312 may receive image data from cameras 306A-D and process such image data (e.g., provide a composite image). Processing circuitry 312 may include any of the controllers and/or other systems described herein. In certain embodiments, processing circuitry 312 may include communications circuitry.

Figure 4A:
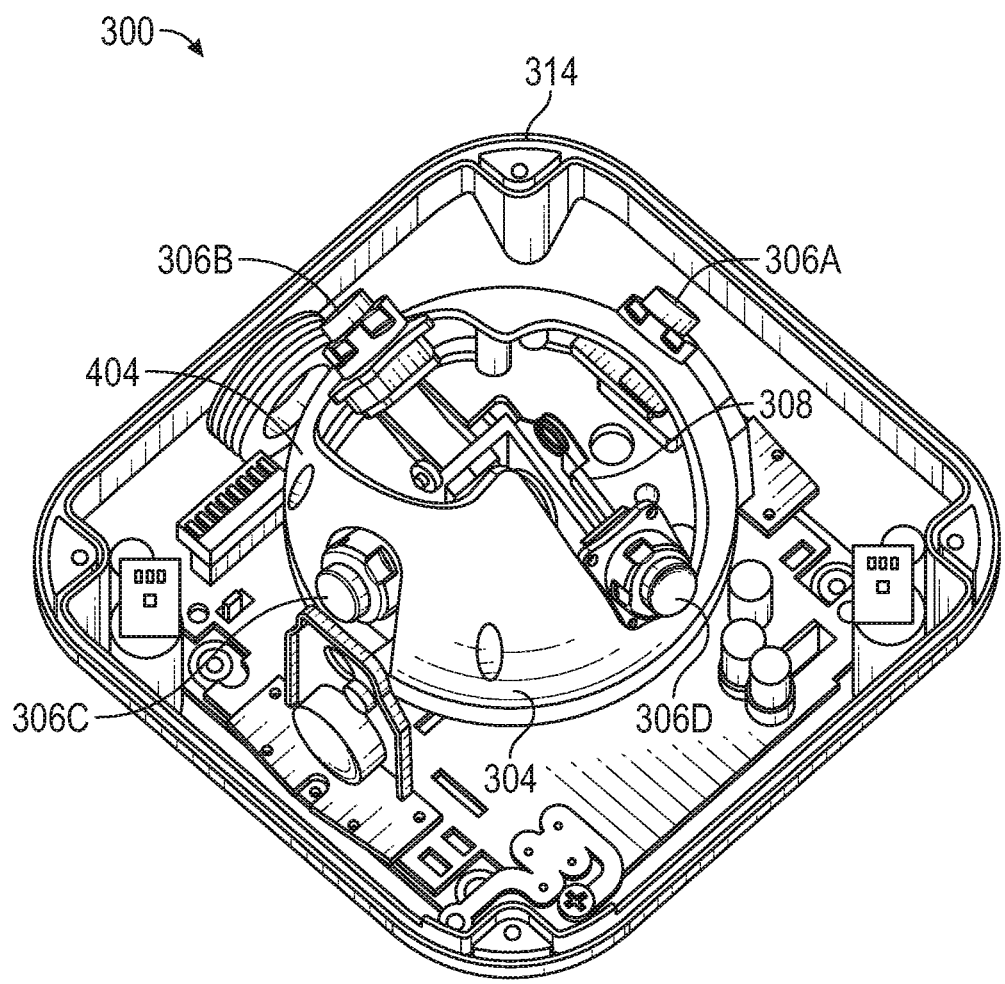
FIGS. 4A-C illustrate various configurations of an imaging system in accordance with an embodiment of the disclosure.
Figure 4B:
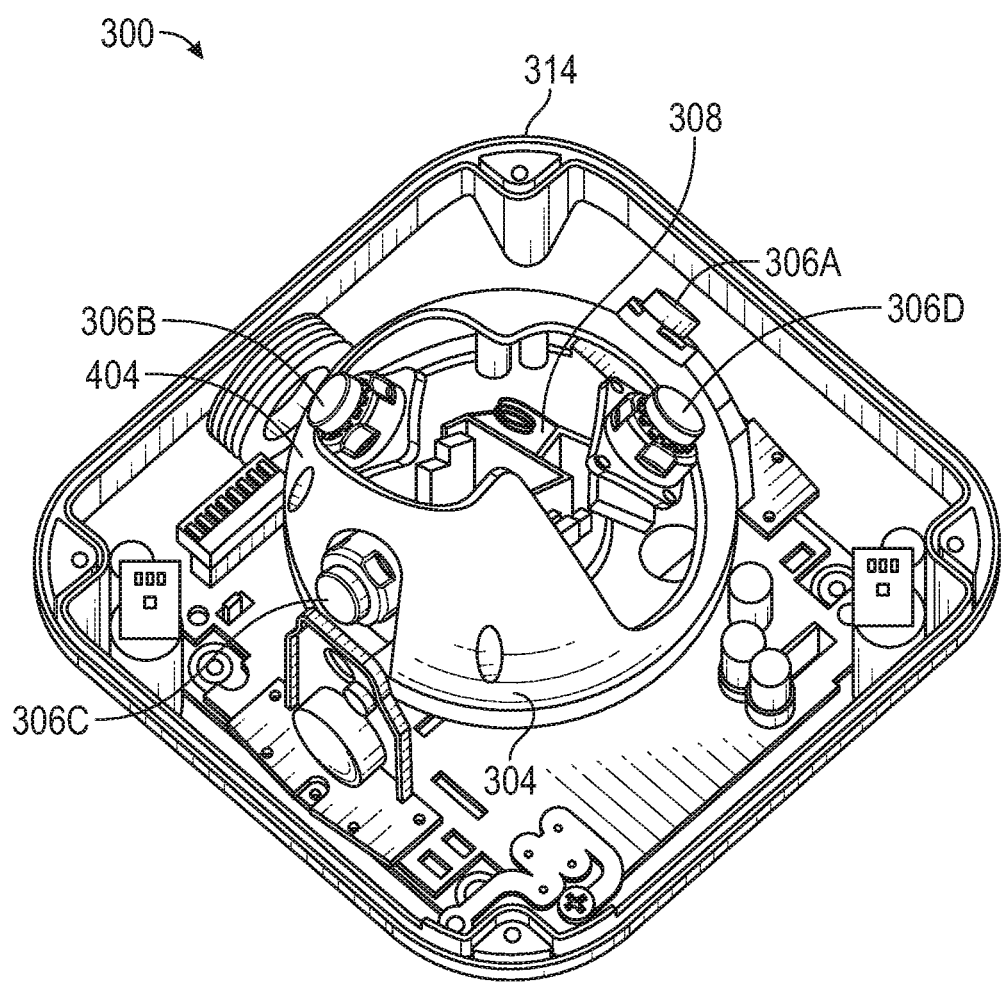
Figure 4C:
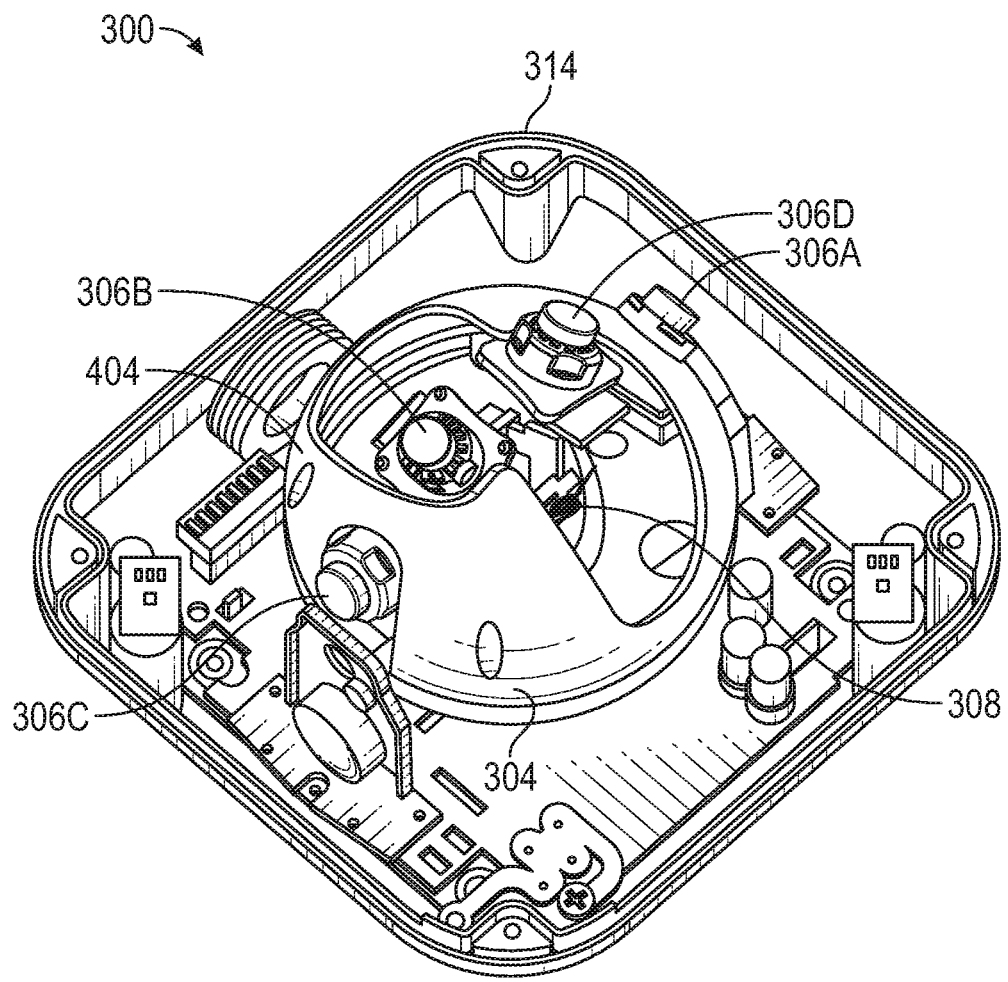

FIGS. 4A-C illustrate various configurations of an imaging system in accordance with an embodiment of the disclosure. As shown in FIG. 4A, cameras 306A-D may be in a 360 degree view configuration. Such a configuration may dispose cameras 306A-D equally spaced around a center of a hemisphere (e.g., each camera equally spaced at a 45 degree angle from an axis). Cameras 306A-D include two fixed cameras, cameras 306A and 306C, and two movable cameras, cameras 306B and 306D. Imaging system 300 may be configured to move cameras 306B and 306D between at least a 360 degree view configuration and a 180 degree view configuration. As both cameras 306A and 306C are positioned in the same position in the 360 view configuration, such cameras are fixed.

Cameras 306B and 306D are moved between the view configurations and their movements are guided by camera guide 304. As shown, positioning arm 308 may be spring loaded to press at least a portion of cameras 306B and 306D against inner open area 404 of camera guide 304. Thus, when moved, cameras 306B and 306D will follow the movement path defined by inner open area 404. Camera guide 304 may include depressions, detents, and/or other features that may lock cameras 306B and 306D in one of a number of pre-set configurations (e.g., the 360 degree view configuration or the 180 degree view configuration). Positioning arm 308 may also concurrently move cameras 306B and 306D and, thus, allow for synchronized positioning thereof. Additionally, other embodiments may include any number of fixed and movable cameras and any number of other view configurations.

FIG. 4B illustrates cameras 306A-D in an intermediate view configuration. In certain embodiments, the intermediate view configuration may be a position between when cameras 306A-D transit between positions, but in other embodiments, the intermediate view configuration may be used to provide a certain version of a composite view as well.

FIG. 4C illustrates cameras 306A-D in a 180 degree view configuration. Such a configuration may dispose cameras 306A-D substantially in line with a center of a hemisphere (e.g., all cameras are in line with each other). Camera guide 304 may include features (e.g., stops, detents, and/or other features that stop cameras from moving further when in the specified view configurations) that define the 180 degree view configuration so that the cameras can be moved between the 180 degree view configuration and the 360 view configurations. Imaging system 300 may move only cameras 306B and 306D when switching between the configurations. Cameras 306B and 306D may be moved manually (e.g., by hand) and/or with one or more electric motors or actuators.

Figure 5A:
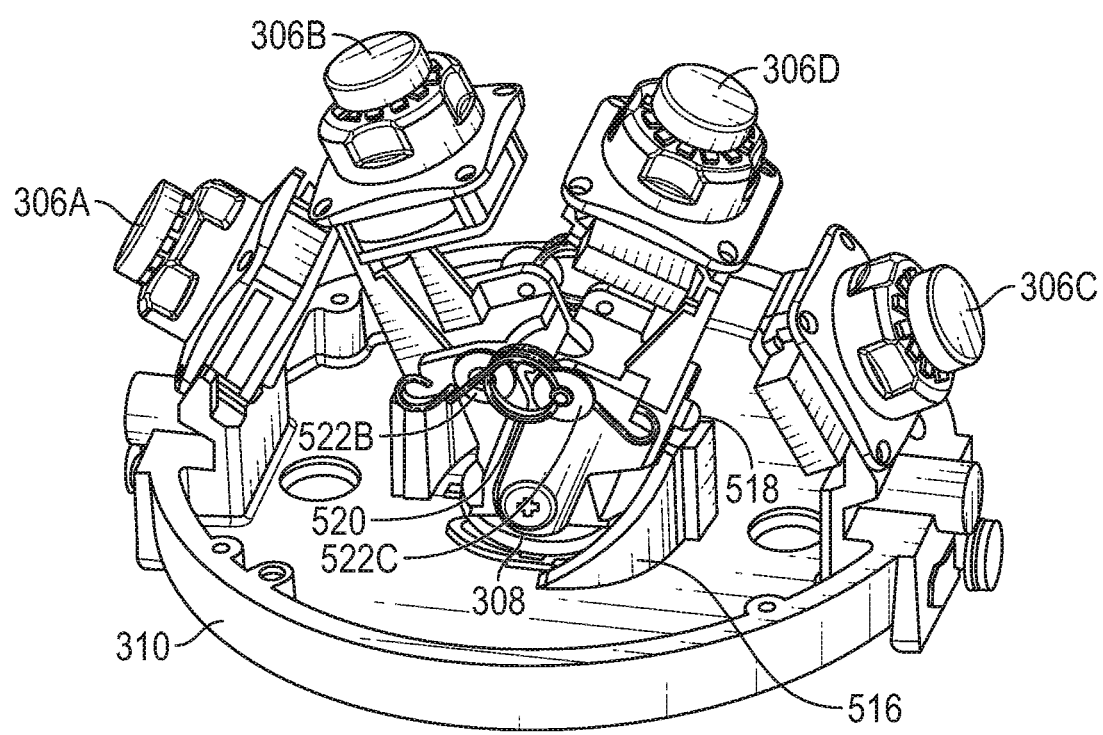
FIGS. 5A and 5B illustrate certain components for moving the camera modules in accordance with an embodiment of the disclosure.
Figure 5B:
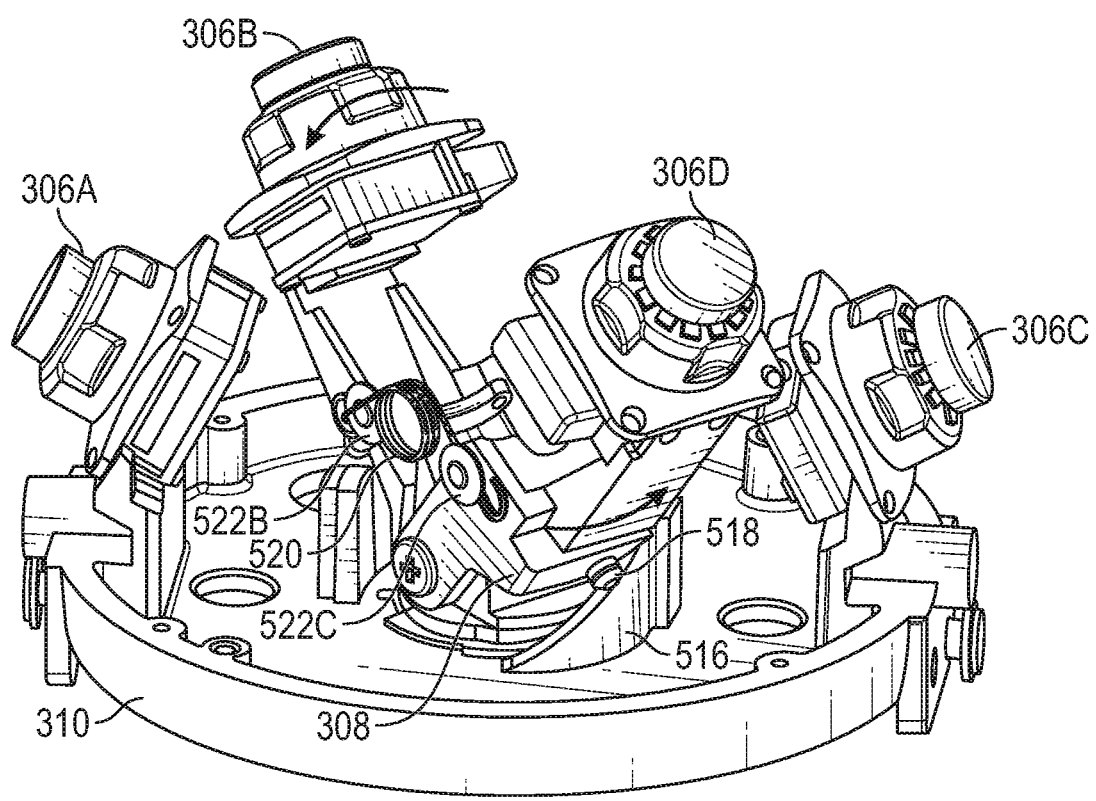

FIGS. 5A and 5B illustrate certain components for moving the camera modules in accordance with an embodiment of the disclosure. FIGS. 5A and 5B further illustrate certain features. For example, as shown in FIGS. 5A and 5B, positioning arm 308 includes spring 520 mounted to spring mounts 522B and 522D and arm guide 518 configured to slide on ramp 516 of base 310.

Spring 520 may couple to spring mounts 522B and 522D and provide force to push the arms of positioning arm 308 (e.g., the portions that cameras 306B and 306D are mounted on) outward. Thus, spring 520 may push cameras 306B and 306D against a side of inner open area 404 and allow the sides of inner open area 404 to control positioning of cameras 306B and 306D.

Positioning of cameras 306B and 306D may also be controlled by arm guide 518 and ramp 516. For example, cameras 306B and 306D may be positioned at a different elevation when in the 180 degree view configuration as compared to when cameras 306B and 306D are in the 360 degree view configuration (e.g., cameras 306B and 306D may be "higher" in the 180 degree view configuration). Accordingly, as cameras 306B and 306D are rotated between the configurations, arm guide 518 may slide along ramp 516 and change the elevation of cameras 306B and 306D. Ramp 516 may also include detents and/or other features to secure cameras 306B and 306D without the various configurations.

As shown in FIG. 5A, cameras 306B and 306D are in a 180 degree view configuration and are disposed at a higher elevation. In FIG. 5B, cameras 306B and 306D are being rotated towards a 360 degree view configuration and are being moved to the lower elevation required of the 360 view configuration.

Figure 6:
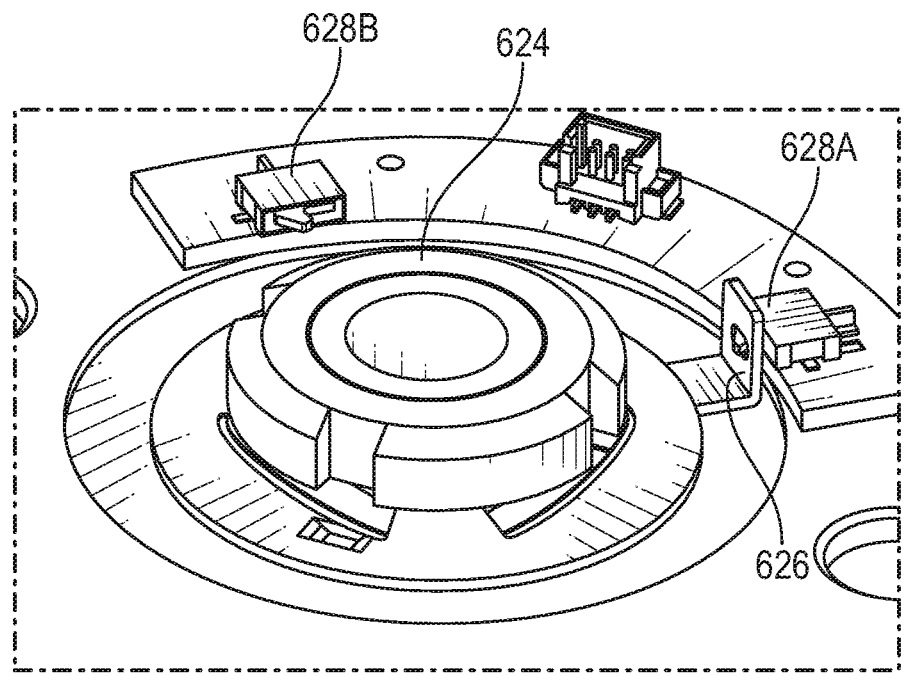
FIG. 6 illustrates a system for detecting the view configuration of the imaging system in accordance with an embodiment of the disclosure.

FIG. 6 illustrates a system for detecting the view configuration of the imaging system in accordance with an embodiment of the disclosure. FIG. 6 illustrates a cam ring 626 and switches 628A and 628B. Switches 628A and 628B may correspond with positions that cameras 306B and 306D rotate into when in the 180 degree view configuration and the 360 degree view configuration, respectively.

Thus, as cameras 306B 306D rotate into the 180 degree view configuration, cam ring 626 may contact and activate switch 628A. Thus, the controller may determine that cameras 306B and 306D are in the 180 degree configuration and process the images accordingly. Conversely, as cameras 306B 306D rotate into the 360 degree view configuration, cam ring 626 may contact and activate switch 628B. Thus, the controller may determine that cameras 306B and 306D are in the 360 degree configuration. While FIG. 6 illustrates one embodiment of determining a view configuration of cameras 306A-D, other embodiments may use other configurations such as software, via an angle sensor of positioning arm 308, via image processing, and/or via other techniques.

Figure 7:
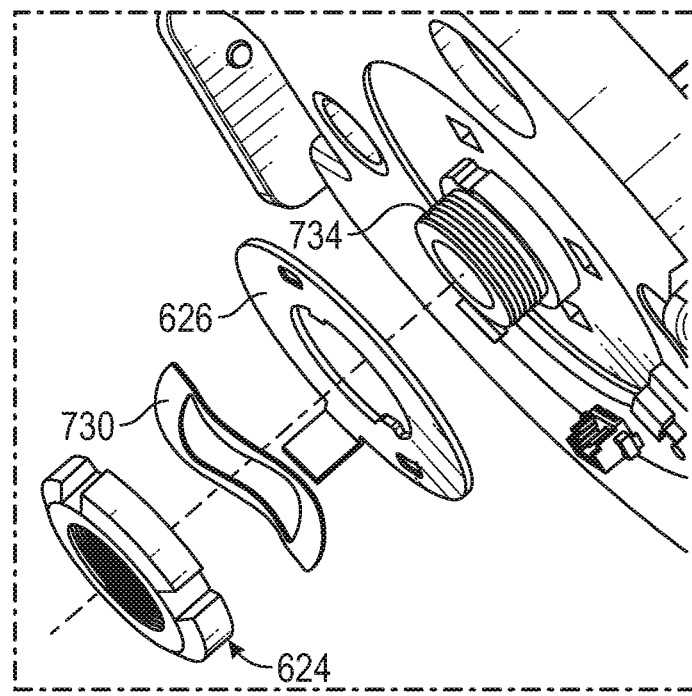
FIG. 7 illustrates certain components of a positioning arm in accordance with an embodiment of the disclosure.

FIG. 7 illustrates certain components of a positioning arm in accordance with an embodiment of the disclosure. FIG. 7 may be an exploded view that may further illustrate various features of the positioning arm including cap 624, wave spring 730, cam ring 626, and key slot 734. As shown, wave spring 730 and cam ring 626 may be disposed around the outside of key slot 734. Cam ring 626 may include protrusions configured to engage with slots of key slot 734 to, thus, rotationally hold cam ring 626 against key slot 734. Accordingly, rotation of key slot 734 can also rotate cam ring 626. Such rotation may accordingly activate switches as shown in FIG. 6. Cap 624 may be threaded onto key slot 734 to hold cam ring 626 against key slot 734. Furthermore, wave spring 730 may be disposed between cam ring 626 and cap 624 to prevent disengagement of cap 624.

Figure 8:
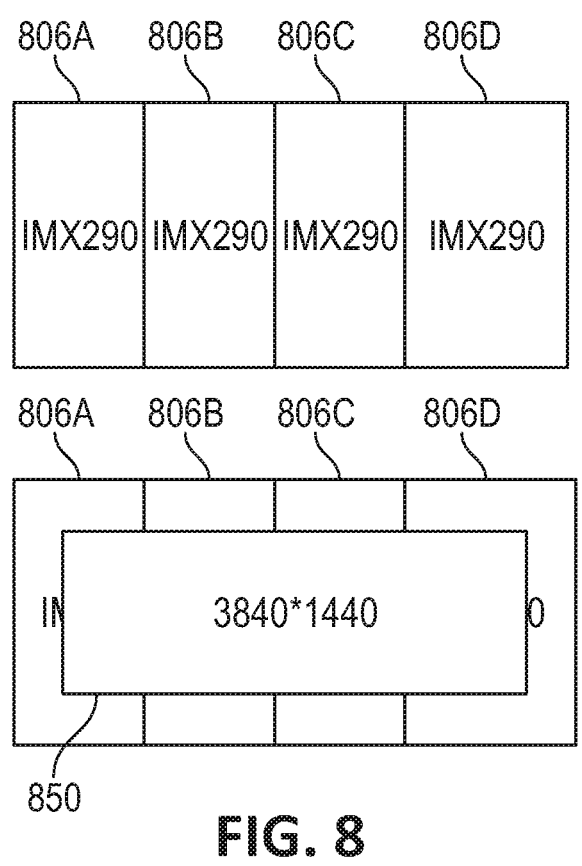
FIG. 8 illustrates a technique for generating a composite image in accordance with an embodiment of the disclosure.

FIG. 8 illustrates a technique for generating a composite image in accordance with an embodiment of the disclosure. Camera images 806A-D may correspond to image data from cameras 306A-D. Camera images 806A-D may be processed (e.g., cropped, stitched together, blended, otherwise processed) to create image 850. For example, image 850 may represent a blended 180 degree or 360 degree image for camera images 806A-D.

Figure 9:
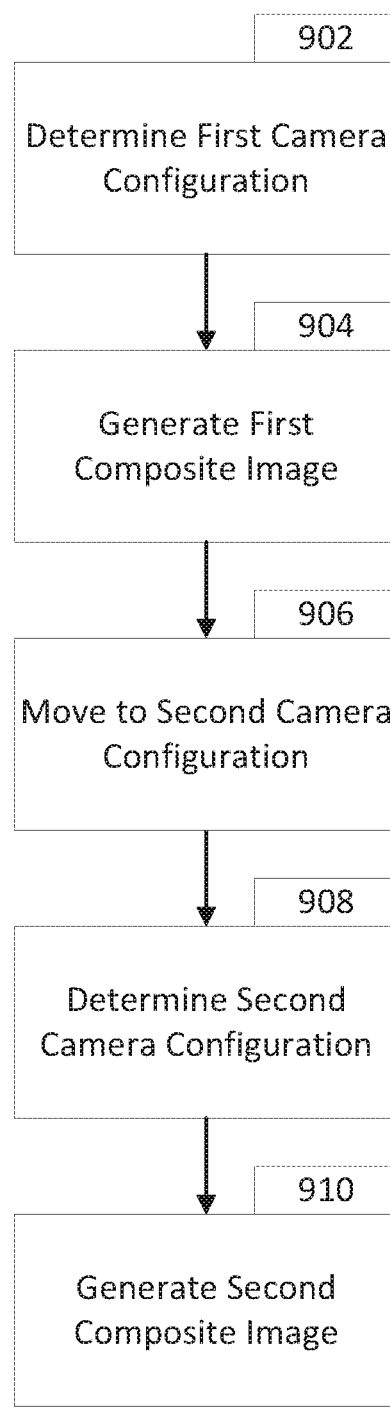
FIG. 9 is a flowchart for operating the multi-camera module imaging system in accordance with an embodiment of the disclosure.

FIG. 9 is a flowchart for operating the multi-camera module imaging system in accordance with an embodiment of the disclosure. In step 902, a first camera view configuration (e.g., 180 degree view) is determined (e.g., by the controller via, for example, detecting whether one of switches 628A or 628B is activated).

In step 904, image data from the cameras is used to generate a composite image. In step 906, the cameras may be moved to a second camera view configuration. For example, the imaging system may be moved and, thus, a new application may be required or viewing situations may change that necessitate changing of the camera view configuration.

In step 908, the controller may determine that the view configuration of the cameras has been changed and that the cameras are now oriented in the second view configuration (e.g., 360 degree view). Thus, in step 910, imaging data from the cameras may be processed and a composite data of the second view configuration may be created.

Figure 10:
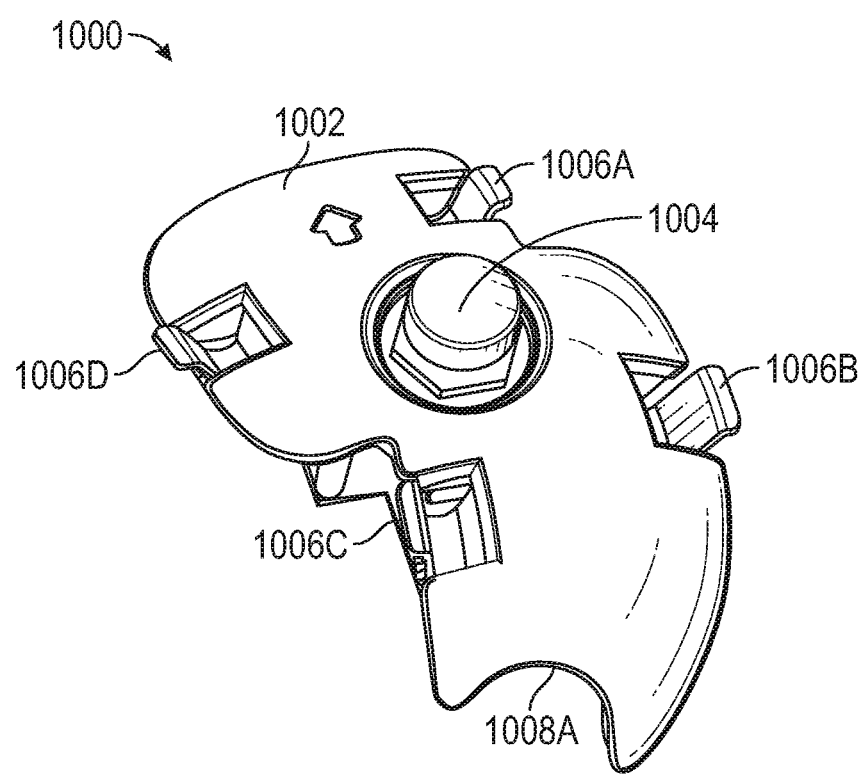
FIG. 10 illustrates a removable camera module for use with the multi-camera imaging system in accordance with an embodiment of the disclosure.

FIG. 10 illustrates a removable camera module for use with the multi-camera imaging system in accordance with an embodiment of the disclosure. FIG. 10 illustrates removable camera module 1000, which may include one or more components of camera module 100 of FIG. 1. Removable camera module 1000 may include module body 1002, camera 1004, and latches 1006A-D. In certain embodiments, removable camera module 1000 may be configured to be installed within imaging system 300 when imaging system 300 is in a 360 degree view configuration. Installing removable camera module 1000 allows for imaging system 300 to include a fifth camera. The fifth camera may allow for a more detailed 360 degree view and/or may allow imaging system 300 to provide images from directly below imaging system 300.

Module body 1002 may be configured to fit within inner open area 404 of imaging system 300. Removable camera module 1000 may be snapped into inner open area 404 and held within camera guide 304 by latches 1006A-D. Thus, removable camera module 1000 may be coupled to imaging system 300 without any additional fasteners or secondary installation operations.

In certain embodiments, removable camera module 1000 may be configured to be installed within imaging system 300 when imaging system 300 is in a certain configuration. For example, removable camera module 1000 of FIG. 10 may be configured to be installed within imaging system 300 when imaging system 300 is in a 360 degree view configuration. Accordingly, module body 1002 may include cutouts 1008A and 1008B (not shown). Cutouts 1008A and 1008B may be disposed on module body 1002 so that module body 1002 will not interfere with any of cameras 306A-D when imaging system 300 is within the 360 view configuration. In certain other embodiments, module body 1002 may include cutouts in other areas so that removable camera module 1000 may be installed within imaging system 300 when imaging system 300 is in other configurations.

Figure 11:
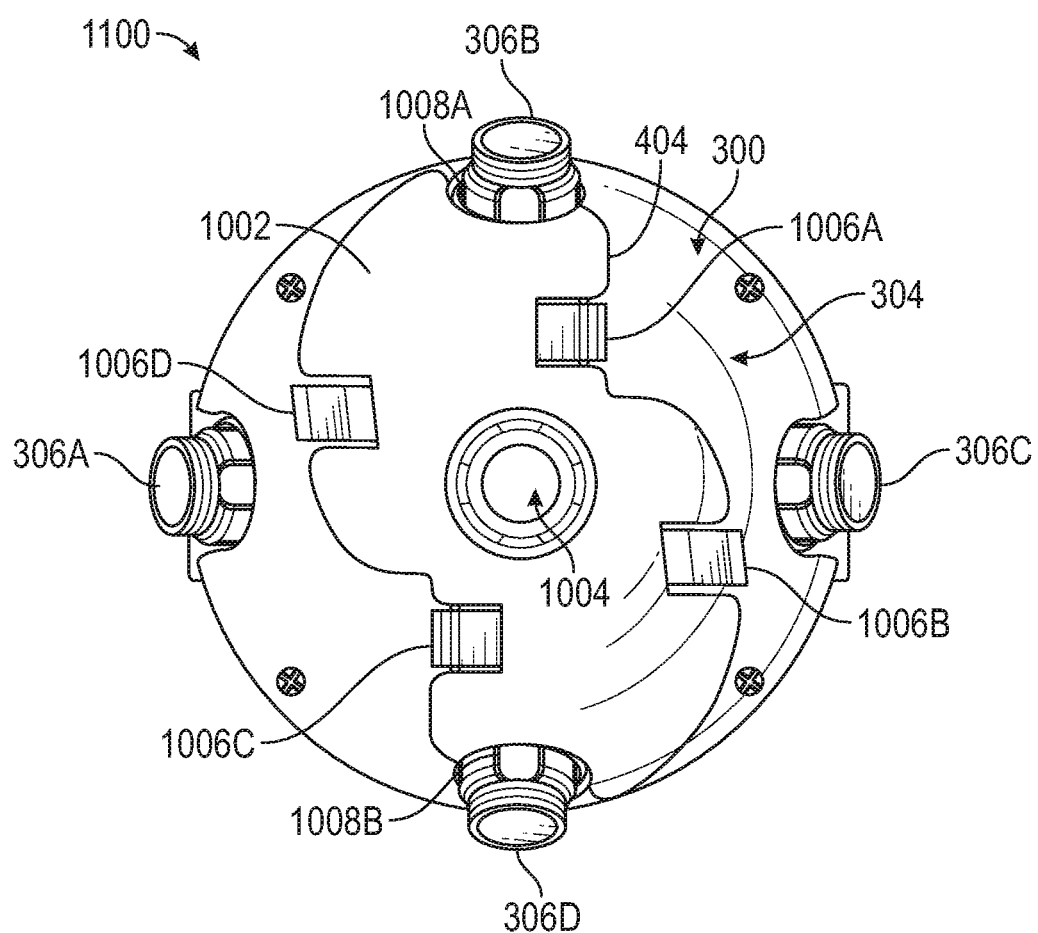
FIG. 11 illustrates a removable camera module installed in a multi-camera imaging system in accordance with an embodiment of the disclosure.

Removable camera module 1000 installed within imaging system 300 is shown in FIG. 11. FIG. 11 illustrates a removable camera module installed in a multi-camera imaging system in accordance with an embodiment of the disclosure. Installing removable camera module 1000 within imaging system 300 may form imaging system 1100.

Module body 1002 may be shaped so that an outer perimeter of module body 1002 is shaped substantially similarly (e.g., with a gap of 5 mm or less when installed) to inner open area 404 of camera guide 304. Furthermore, as shown in FIG. 11, cutouts 1008A and 1008B may be disposed adjacent to cameras 306B and 306D, respectively, when cameras 306B and 306D are in the 360 degree view configuration.

Latches 1006A-D may hold removable camera module 1000 within inner open area 404. Latches 1006A-D may couple to the outer perimeter of inner open area 404. When removable camera module 1000 is installed within inner open area 404, latches 1006A-D may hold removable camera module 1000 within inner open area 404 unless latches 1006A-D are manipulated.

Removable camera module 1000 may include camera 1004. Camera 1004 may be installed or coupled within module body 1002 and positioned so that, when removable camera module 1000 is installed within imaging system 300, camera 1004 is positioned between cameras 306A-D. When imaging system 300 is configured to be installed on a ceiling, removable camera module 1000 may be configured to position camera 1004 so that camera 1004 is facing substantially downward. Additionally, imaging system 300 may be configured so that cameras 306A-D are, in the 360 degree view configuration, facing at an angle to view areas along the side of imaging system 300.

Figure 12A:
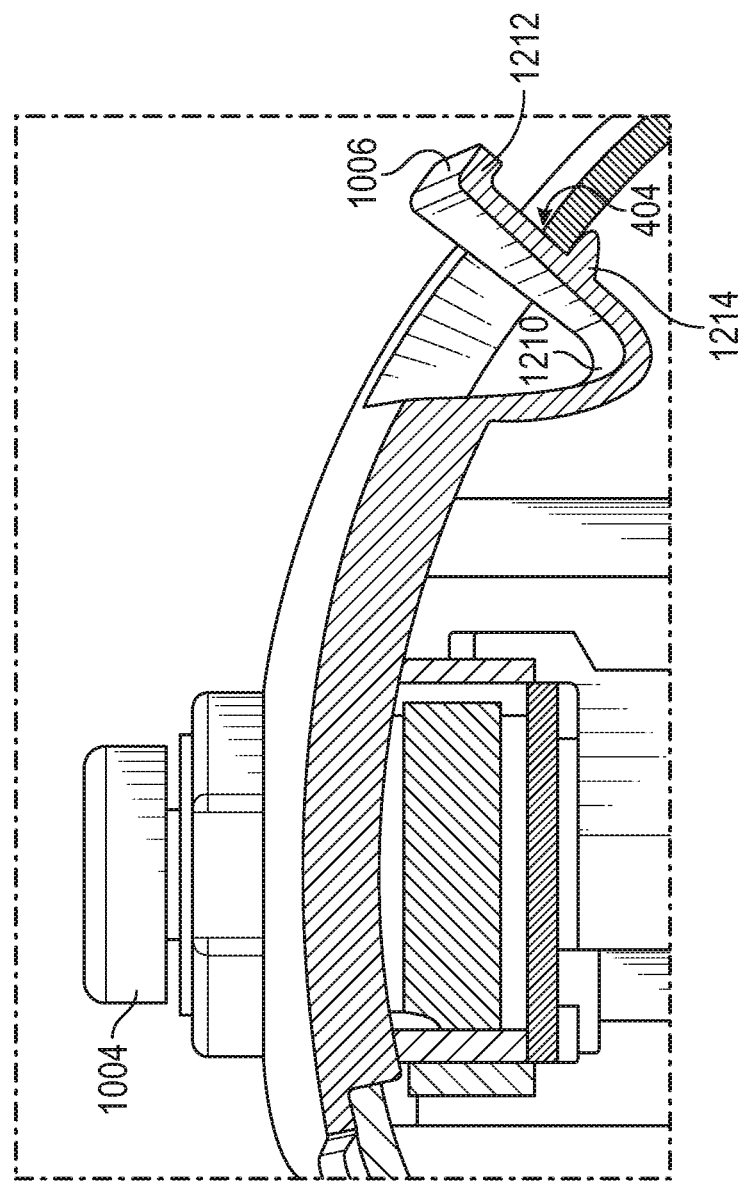
FIG. 12A illustrates portions of the removable camera module in accordance with an embodiment of the disclosure.

FIG. 12A illustrates portions of the removable camera module in accordance with an embodiment of the disclosure. Latch 1006 is shown in further detail in FIG. 12A. In FIG. 12A, latch 1006 includes tab body 1210, upper lip 1212, and lower lip 1214. While latch 1006 of FIG. 12A may be a U-shaped latch, other embodiments may include straight latches, Z-shaped latches, or latches of other shapes. Latch 1006 may be flexible and configured to spring-ably deform when subjected to an external force.

Latch 1006 may include upper lip 1212 and lower lip 1214. Upper lip 1212 and/or lower lip 1214 may prevent removable camera module 1000 from accidentally decoupling from imaging system 300. A ledge of camera guide 304 may be disposed between upper lip 1212 and lower lip 1214. Thus, upper lip 1212 and lower lip 1214 may prevent movement or movement beyond a threshold of removable camera module 1000 upward or downward, respectively. If latch 1006 is manipulated (e.g., pushed inward towards camera 1004), upper lip 1212 and/or lower lip 1214 may clear the ledge of camera guide 304. Removable camera module 1000 may be decoupled from imaging system 300 if all latches are so manipulated.

In certain embodiments, lower lip 1214 may be configured to contact a portion of a ledge of camera guide 304 during insertion of removable camera module 1000. When lower lip 1214 contacts the ledge, insertion force of removable camera module 1000 into inner open area 404 may increase. The increase in force may provide haptic feedback to a user inserting the removable camera module 1000. In certain embodiments, lower lip 1214 may instead be configured to prevent insertion of removable camera module 1000 into inner open area 404 unless latches 1006A-D are operated to prevent or minimize contact of lower lip 1214 with the ledge. Operation of latches 1006A-D may also allow for removable camera module 1000 to be decoupled from imaging system 300.

Upper lip 1212 may be configured to contact a portion of the ledge to prevent over-insertion of removable camera module 1000. Furthermore, in certain embodiments, upper lip 1212 may function as a surface for fingers of a user to grasp onto. Extraction effort of removable camera module 1000 may thus be decreased, increasing convenience to the user.

Figure 12B:
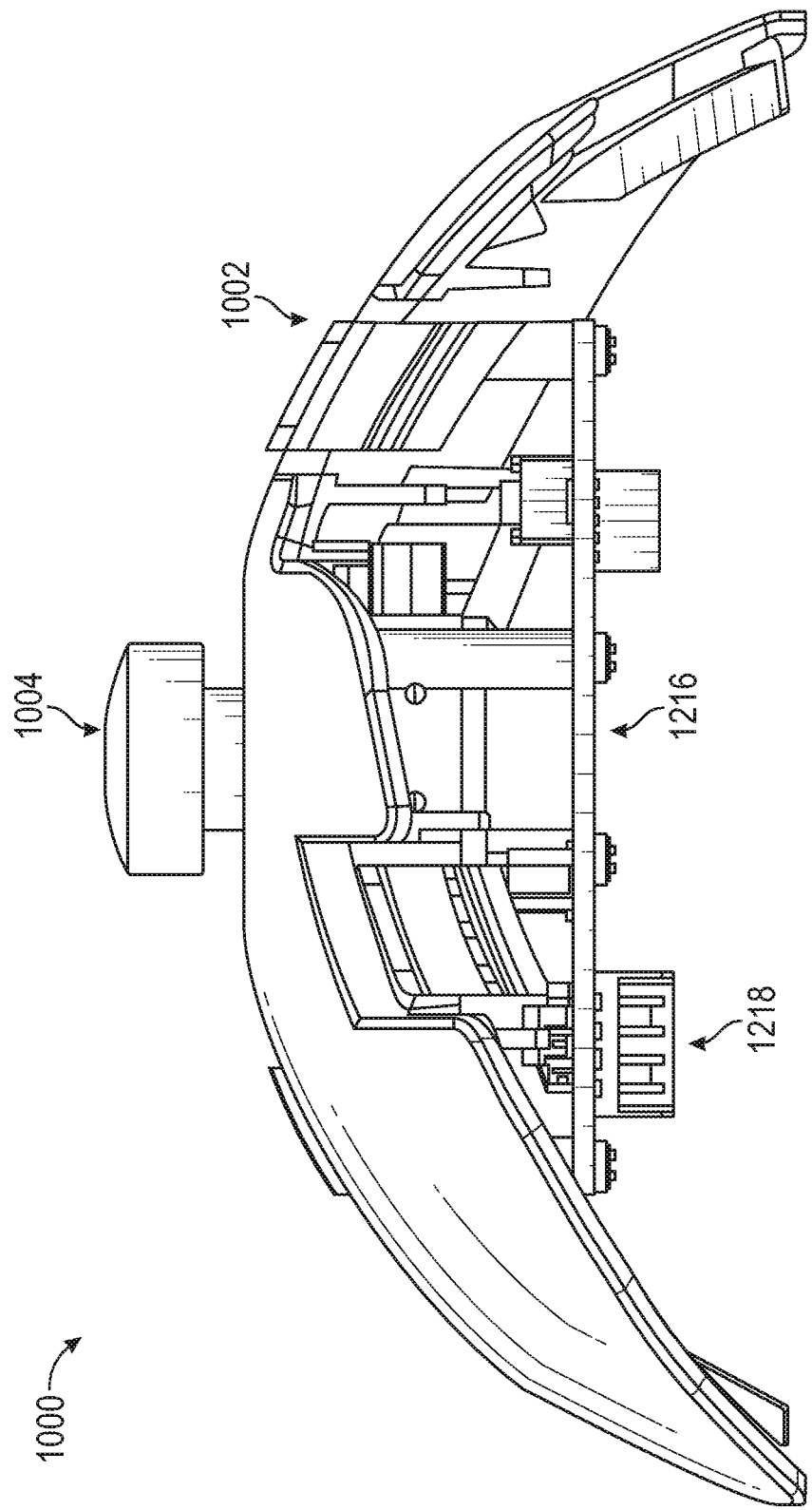
FIG. 12B illustrates the removable camera module in accordance with an embodiment of the disclosure.

FIG. 12B illustrates the removable camera module in accordance with an embodiment of the disclosure. FIG. 12B illustrates a side view of removable camera module 1000. Removable camera module 1000 may further include circuitry 1216. Circuitry 1216 may include one or more electronic circuits, printed circuit boards, connectors, and/or other components. Circuitry 1216 may be communicatively connected (e.g., connected through wired or wireless interfaces) to camera 1000 and may receive signals from camera 1000 (e.g., image data from camera 1000).

When removable camera module 1000 is coupled to imaging system 300, removable camera module 1000 may provide image data from camera 1000 to imaging system 300. Thus, for example, connector 1218 may couple to a corresponding connector of imaging system 300 when removable camera module 1000 is installed within imaging system 300. Camera 1004 may then provide image data to circuitry 1216, and image data may then be provided to imaging system 300 via connector 1218. Imaging system 300 may receive such image data and incorporate the image data to output a composite image (e.g., a 360 degree view image).

Figure 13:
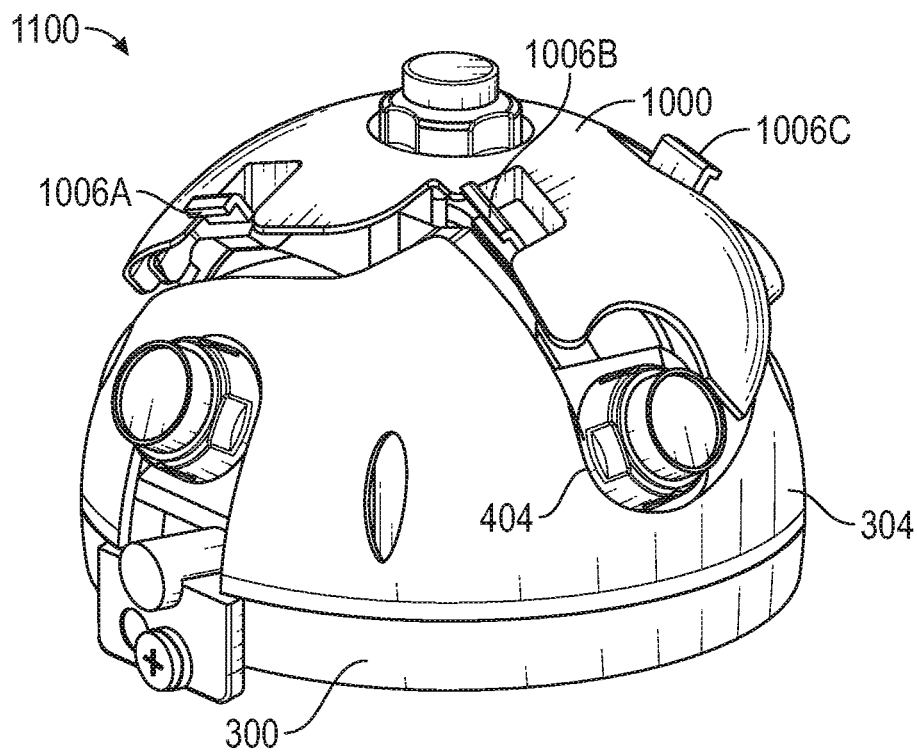
FIG. 13 illustrates a step in the installation of a removable camera module into a multi-camera imaging system in accordance with an embodiment of the disclosure.

FIG. 13 illustrates a step in the installation of a removable camera module into a multi-camera imaging system in accordance with an embodiment of the disclosure. Removable camera module 1000 may be positioned over imaging system 300 to be inserted into inner open area 404. Removable camera module 1000 may thus be configured to be installed within imaging system 300 by inserting removable camera module 1000 downward into inner open area 404. Latches 1006A-D may be configured to snap into place and prevent removable camera module 1000 from accidentally decoupling from imaging system 300 when removable camera module 1000 is installed.

Latches 1006A-D may be configured to be coupled to one or more ledges of camera guide 304. While camera guide 304 of imaging system 300 does not include cutouts to receive latches 1006A-D, other embodiments may include cutouts to receive and/or positions latches and such latches may be accordingly configured to interface with the cutouts.

Figure 14:
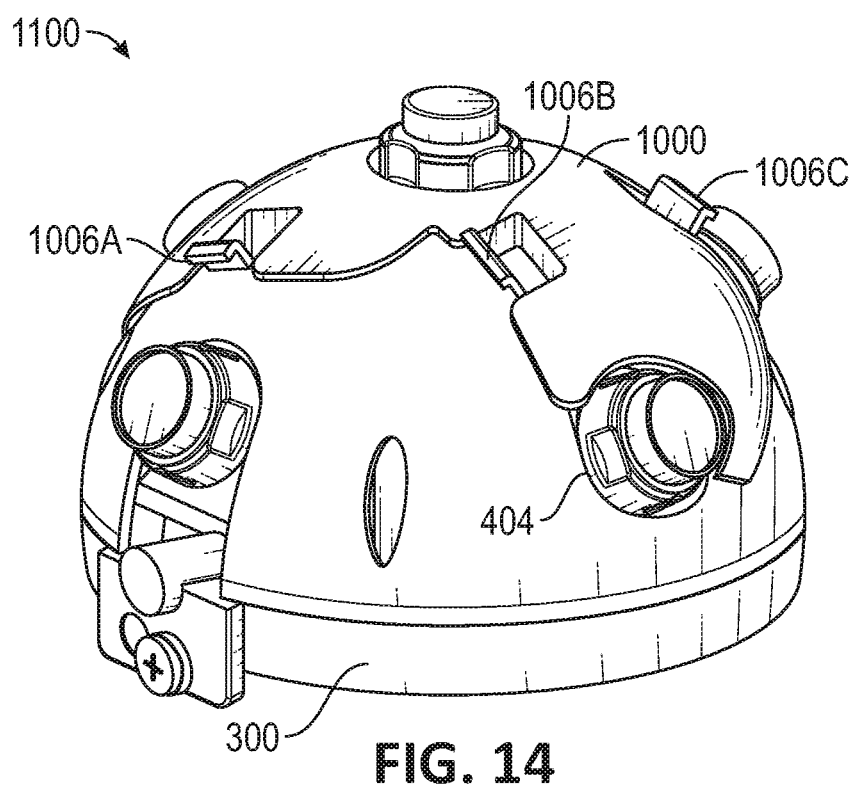
FIG. 14 illustrates another step in the installation of a removable camera module into a multi-camera imaging system in accordance with an embodiment of the disclosure.

FIG. 14 illustrates another step in the installation of a removable camera module into a multi-camera imaging system in accordance with an embodiment of the disclosure. In FIG. 14, removable camera module 1000 may be almost fully inserted into inner open area 404. Connector 1218 of removable camera module 1000 may be engaged with a corresponding connector of imaging system 300. Furthermore, lower lip 1214 of latches 1006A-D may be positioned under the ledge of camera guide 304. Positioning lower lip 1214 under the ledge of camera guide 304 may prevent removable camera module 1000 from being accidentally disengaged from imaging system 300. Latches 1006A-D may be pressed by a user to disengage removable camera module 1000 from imaging system 300.

Figure 15:
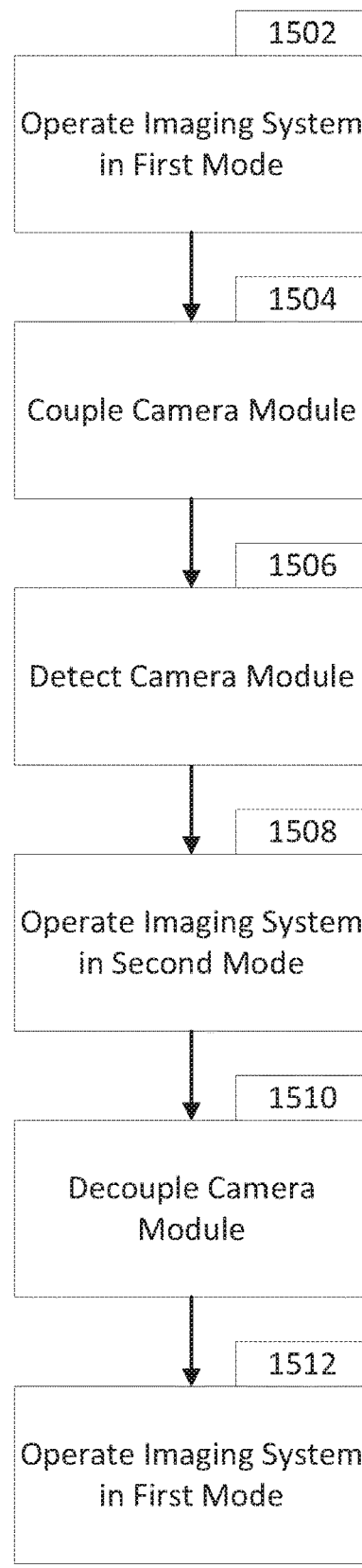
FIG. 15 is a flowchart for operating the multi-camera module imaging system with a removable camera module in accordance with an embodiment of the disclosure.

FIG. 15 is a flowchart for operating the multi-camera module imaging system with a removable camera module in accordance with an embodiment of the disclosure. In block 1502, the imaging system is operated in a first mode. The first mode may be, for example, a 360 degree viewing mode.

In block 1504, the removable camera module may be coupled (e.g., inserted) into the imaging system. Coupling the removable camera module into the imaging system may provide an additional camera for the imaging system. Thus, an imaging system with 4 cameras may, when the removable camera module is inserted, become a 5 camera imaging system. The removable camera module may be coupled to the imaging system by snapping in the removable camera module to an opening within the imaging system. A connector of the removable camera module may engage a connector of the imaging system to electrically connect the removable camera to the imaging system. Such an electrical connection may allow removable camera module to transfer data to or receive data from the imaging system.

In certain embodiments, the imaging system may be configured to only receive the removable camera module when imaging system is oriented in a certain configuration. For example, the imaging system may be configured to only receive the removable camera module when the imaging system is operated in a 360 degree view configuration. Operating the imaging system in a 180 degree view configuration may result in portions of the removable camera module contacting the imaging system, preventing coupling of the removable camera module.

In block 1506, the imaging system may detect that the removable camera module has been coupled to the imaging system. The imaging system may receive data from the removable camera module indicating that the removable camera module is communicatively coupled to the imaging system. In certain embodiments, such data may include image data.

After the imaging system detects that the removable camera module has been coupled to the imaging system, the imaging system may be operated in a second mode in block 1508. The second mode may utilize image data from the removable camera module. Thus, for example, the imaging system may provide images or video of the area directly beneath the imaging system when operated in the second mode. Image data from such a view may be incorporated into an existing 360 degree view and, accordingly, provide images of a larger portion of the area adjacent to the imaging system. Certain embodiments may automatically detect that the removable camera module has been coupled to the imaging system and operate the imaging system in the second mode accordingly, but other embodiments may require a user to place the imaging system into the second mode.

In block 1510, the removable camera module may be decoupled from the imaging system. The removable camera module may be decoupled by operating the latches of the removable camera module and lifting the removable camera module out of the inner open area of the imaging system. In certain embodiments, the imaging system may automatically detect when a removable camera module has been disengaged, but other embodiments may require the user to place the camera in a different operating mode that does not require data from the removable camera module.

In block 1512, after the removable camera module has been decoupled from the imaging system, imaging system may then revert to the first operating mode. Thus, in certain embodiments, the imaging system may determine that the removable camera module has been decoupled and revert to a 360 degree view mode that does not require image data from the removable camera module.

As systems and techniques described herein may, in various embodiments, allow for a multi-camera or sensor imaging system to be switched between a plurality of modes, including a 180 degree viewing mode, a 360 degree viewing mode, and a 360 degree viewing mode with a downward pointing camera. Such a viewing mode may be automatically detected. Data from the multiple sensors and/or cameras may be processed on the front end (e.g., within processing circuitry of a FPGA) and thus utilize lens distortion correct, blended stitching, and/or other correction techniques of the FPGA.

At least some of the cameras and/or sensors may be moved along one or more tracks on a hemisphere surface. Thus, the camera module configuration may be modified according to the required image perspective. In certain embodiments, one or more cameras may be connected to rotational bars that control movement of the respective cameras. Furthermore, one or more additional cameras may be coupled to the imaging system by, for example, coupling a camera module to the imaging system by inserting the camera module into an opening of the imaging system. Thus, changing the configuration of the camera array may be performed without adding or removing parts.

In certain embodiments, in order to get a 180 degree horizontal view angle video stream, the multi-camera or sensor imaging system may line up the cameras on the same meridian. For a 360 degree view angle video stream, the cameras may be equally spread on the same altitude and quadrant longitudinal lines on a hemisphere and a further camera may or may not be disposed between the cameras on the periphery. The optic axes of all peripheral cameras may be in line with the center of the hemisphere (e.g., 45 degrees south, 45 degrees east, 135 degrees east, 45 degrees west, 135 degrees west). The imaging system may be switched between the views.

180 degree view angles may be used on, for example, wall installations. 360 degree view angles may be used on, for example, ceiling installations. With the imaging systems described herein, an installer may avoid purchasing two different types of cameras for the different installations. Thus, such imaging systems may, for example, be moved from a wall installation to a ceiling installation and vice versa according to the required image perspective. The cameras may be accordingly moved along certain tracks on a hemisphere surface.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
a base;
a camera guide comprising an inner open area;
a positioning arm; and
a plurality of camera modules coupled to the base, wherein at least one of the plurality of camera modules is a movable camera module coupled to the positioning arm configured to move the movable camera module between at least a plurality of view configurations, wherein the movable camera module is disposed within the inner open area of the camera guide, and wherein the inner open area is configured to control a movement path of the movable camera module.

2. The apparatus of claim 1, wherein the view configurations comprise at least a horizontal view and a 360 degree view.

3. The apparatus of claim 1, wherein the positioning arm is configured to position the camera module so that at least a portion of the camera module contacts at least a portion of the inner open area.

4. The apparatus of claim 1, wherein the plurality of camera modules comprises four camera modules and wherein two of the four cameras are movable camera modules, wherein the two movable camera modules are coupled to the positioning arm, and wherein the positioning arm is configured to move the two movable camera modules in concert.

5. The apparatus of claim 1, further comprising a controller configured to:
receive camera data from the plurality of camera modules;
create a composite image from the camera data; and
and output the composite image to a security controller.

6. The apparatus of claim 5, wherein the controller is further configured to determine the view configuration of the at least one movable camera module and create the composite image in response to the view configuration.

7. The apparatus of claim 6, wherein the determining the view configuration comprises receiving a signal from one or more configuration switches indicating the view configuration.

8. The apparatus of claim 5, further comprising a removable camera module comprising:
a module body;
a camera disposed within the module body; and
a plurality of latches, wherein the module body is configured to be disposed within the inner open area when the at least one movable camera module is operating in a first view configuration, and wherein the plurality of latches are configured to couple to a portion of the camera guide to hold the module body within the inner open area.

9. A method of operating the apparatus of claim 8, the method comprising:
disposing the camera modules in a first view configuration;
disposing the removable camera module within the inner open area;
communicatively coupling the removable camera module to the controller; and
coupling the plurality of latches to a portion of the camera guide to hold the camera module within the inner open area.

10. A removable camera module comprising:
a module body comprising a plurality of cutouts;
a camera disposed within the module body; and
a plurality of latches, wherein the module body is configured to be disposed within an opening of a camera system operating in a first view configuration to couple to the camera system, and wherein the plurality of latches are configured to couple to a portion of a camera guide of the camera system to hold the module body within the opening.

11. The removable camera module of claim 10, wherein each of the plurality of cutouts is configured to be disposed adjacent to a movable camera module of the camera system.

12. The removable camera module of claim 10, wherein the plurality of latches each comprise an upper lip and a lower lip.

13. The removable camera module of claim 10, wherein the first view configuration is a 360 degree view configuration, and wherein the camera system is configured to operate in a plurality of view configurations and the module body is configured to contact a portion of the camera system when the camera system is operating in a second view configuration to prevent coupling of the camera module to the camera system when the camera system is in the second view configuration.

14. The removable camera module of claim 10, further comprising a module connector communicatively coupled to the camera and configured to couple to a system connector of the camera system to provide image data from the camera to the camera system.

15. The removable camera module of claim 10, wherein the camera is configured to provide image data for an area below the camera system when camera module is coupled to the camera system.

16. An apparatus comprising:
an imaging system comprising:
a base;
a camera guide comprising an inner open area;
a positioning arm; and
a plurality of camera modules coupled to the base, wherein at least one of the plurality of camera modules is a movable camera module coupled to the positioning arm configured to move the movable camera module between at least a plurality of view configurations, wherein the movable camera module is disposed within the inner open area of the camera guide; and
a removable camera module comprising:
a module body comprising a plurality of cutouts;
a camera disposed within the module body; and
a plurality of latches, wherein the module body is configured to be disposed within the inner open area when the imaging system is operating in a first view configuration, and wherein the plurality of latches are configured to couple to a portion of the camera guide to hold the module body within the inner open area.

17. The apparatus of claim 16, wherein each of the plurality of cutouts is configured to be disposed adjacent to one of the camera modules of the imaging system, and wherein the view configurations comprise at least a horizontal view and a 360 degree view.

18. A method of operating the apparatus of claim 17, the method comprising:
configuring the imaging system to be in the 360 degree view configuration;
disposing the removable camera module within the inner open area;
communicatively coupling the removable camera module to the imaging system; and
coupling the plurality of latches to a portion of the camera guide to hold the camera module within the inner open area.

19. The method of claim 18, further comprising:
communicating image data from the camera of the removable camera module to a controller of the imaging system;
receiving, with the controller, camera data from the plurality of camera modules;
creating a composite image from the camera data and the image data; and
and outputting the composite image to a security controller.

20. The method of claim 18, wherein the communicatively coupling the removable camera module to the imaging system comprises electrically engaging a module connector of the removable camera module with a system connection of the imaging system.

* * * * *